United States Patent
Kumazawa et al.

(10) Patent No.: US 6,589,465 B2
(45) Date of Patent: Jul. 8, 2003

(54) METHOD FOR PRODUCING CERAMIC HONEYCOMB STRUCTURAL BODY

(75) Inventors: Kazuhiko Kumazawa, Nagoya (JP); Yasushi Noguchi, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/958,711
(22) PCT Filed: Jan. 26, 2001
(86) PCT No.: PCT/JP01/00557
§ 371 (c)(1),
(2), (4) Date: Jan. 17, 2002
(87) PCT Pub. No.: WO01/58827
PCT Pub. Date: Aug. 16, 2001

(65) Prior Publication Data
US 2002/0180119 A1 Dec. 5, 2002

(30) Foreign Application Priority Data
Feb. 14, 2000 (JP) .......................... 2000-035323
Nov. 14, 2000 (JP) .......................... 2000-346649

(51) Int. Cl.$^7$ .......................................... C04B 35/195
(52) U.S. Cl. .................. 264/177.12; 264/630; 264/631; 264/177.11
(58) Field of Search .................. 264/630, 631, 264/669, 670, 638, 177.12, 177.11

(56) References Cited

U.S. PATENT DOCUMENTS

| 4,496,506 A | * | 1/1985 | Sakato et al. ............... 264/109 |
| 4,968,460 A | * | 11/1990 | Thompson et al. ............ 264/6 |
| 5,938,992 A | * | 8/1999 | Hamanaka et al. ........... 264/43 |
| 6,284,188 B1 | * | 9/2001 | Andou et al. ............... 264/631 |

FOREIGN PATENT DOCUMENTS

| JP | 51-124110 | 10/1976 |
| JP | 2-164765 | 6/1990 |

* cited by examiner

Primary Examiner—James Derrington
(74) Attorney, Agent, or Firm—Parkhurst & Wendel, L.L.P.

(57) ABSTRACT

The raw materials for forming a cordierite composition are dissolved into water with a dispersing agent to prepare a slurry, and the thus prepared slurry is passed through the sieve having a mesh of 45 μm or less. After that, the slurry after sieving is dried by means of the spray drying to obtain dry powders, and the batch for forming is obtained by using the dry powders. Or, the batch for forming is obtained by the filter pressing. That is to say, the batch for forming is obtained by using the raw material powders which are passed through the sieve in a wet state. Therefore, it is possible to prevent agglutination of the raw material particles and to remove the coarse raw material particles effectively. As a result, if the extrusion molding is performed by using the thus obtained batch for forming, it is possible to form the ceramic honeycomb structural body having an extremely thin wall thickness with no defects.

4 Claims, 3 Drawing Sheets

METHOD FOR PRODUCING CERAMIC HONEYCOMB STRUCTURAL BODY

TECHNICAL FIELD

The present invention relates to a method of producing a ceramic honeycomb structural body having a cordierite composition by means of an extrusion molding, and particularly relates to a method suitable for producing a ceramic honeycomb structural body having a thin wall thickness of 50 μm or less.

BACKGROUND ART

Generally, various methods for producing a honeycomb structural body having a cordierite composition by means of an extrusion molding using a molding die are known. In all the known methods, a predetermined ceramic honeycomb structural body is produced by mixing predetermined ceramic raw materials, adding a forming agent and water to the resultant mixture to obtain a batch for forming, and extruding the batch through the molding die. The molding die used here comprises a plurality of batch supply holes arranged at a batch supply side thereof and slits communicating with the batch supply holes arranged at a batch discharge side thereof. Therefore, the slit defines a wall thickness of the honeycomb structural body.

When the ceramic honeycomb structural body is produced by means of the extrusion molding according to the known producing method, and, particularly when the ceramic honeycomb structural body having a thin wall is produced by means of the extrusion molding, if a raw material particles larger than the wall thickness of the ceramic honeycomb structural body to be formed is included in the ceramic raw materials, the raw material particle is stuck for the slit of the molding die, and thus defects occur at a corresponding portion of the ceramic honeycomb structural body after the extrusion molding. Therefore, coarse particles are generally removed from the raw materials in consideration of the wall thickness of the ceramic honeycomb structural body to be formed by means of the extrusion molding.

As the coarse particle removing process from the ceramic raw materials, use is made of an air elutriation using for example Alpine type classifier for the wall thickness of 150 μm or more, and further use is made of for example a centrifugal type classifier for the wall thickness of 50 μm or more. However, in the air elutriation using Alpine type classifier, there is a drawback that raw material particles are agglutinated. Moreover, in the case of using the centrifugal type classifier, there is a drawback that an industrially available sieve is a mesh of 45 μm. Therefore, in order to extrude the ceramic honeycomb structural body having the wall thickness of 50 μm or less that is highly required in a recent year, it is not possible to use the air elutriation process or the centrifugal type classifier as mentioned above. In addition, in the case of classifying the raw materials, a miss classification surely occurs. That is to say, if the raw materials are classified by using a centrifugal type sieve having a mesh of 45 μm, the coarse particle larger than 45 μm are not always removed. Therefore, use is experimentally made of a sieve having a mesh 10% or more smaller than a slit width of the die using for the extrusion molding of the honeycomb structural body to be formed.

DISCLOSURE OF INVENTION

An object of the invention is to eliminate the drawbacks mentioned above and to provide a method for producing a ceramic honeycomb structural body which can prevent an agglutination of raw material particles and which can remove coarse raw material particles effectively.

According to a first aspect of the invention, a method for producing a ceramic honeycomb structural body, comprises the steps of: providing raw materials for forming a cordierite composition; preparing slurries of respective raw materials to obtain raw material slurries respectively; slowing the thus obtained raw materials slurries to pass through a sieve having a mesh of 45 μm or less; subjecting the raw material slurries, that are passed through the sieve, respectively to spray drying to prepare raw material powders; mixing the thus prepared raw material powders to obtain a mixture having a cordierite composition; adding a forming agent and water to the thus obtained mixture to obtain a batch for forming; and subjecting the thus obtained batch for forming to an extrusion molding to obtain a honeycomb structural body having a wall thickness of 50 μm or less.

Moreover, according to a second aspect of the invention, a method for producing a ceramic honeycomb structural body, comprises the steps of: providing a mixture of raw materials for forming a cordierite raw material slurry; allowing the thus obtained cordierite raw material slurry to pass through a sieve having a mesh of 45 μm or less; subjecting the cordierite raw material slurry, that are passed through the sieve, to spray drying to prepare raw material powders; adding a forming agent and water to the thus prepared raw material powders to obtain a batch for forming; and subjecting the thus obtained batch for forming to an extrusion molding to obtain a honeycomb structural body having a wall thickness of 50 μm or less.

Further, according to a third aspect of the invention, a method of producing a ceramic honeycomb structural body, comprises the steps of: providing a mixture of raw materials for forming a cordierite composition; preparing a slurry of the mixture to obtain a cordierite raw material slurry; allowing the thus obtained cordierite raw material slurry to pass through a sieve having a mesh of 45 μm or less; dissolving methyl cellulose and slip additives into the cordierite raw material slurry, that are passed through the sieve, as forming agents; subjecting the cordierite raw material slurry into which the forming agents are dissolved to filter pressing to obtain a batch for forming having a predetermined water amount; and subjecting the thus obtained batch for forming to obtain a honeycomb structural body having a wall thickness of 50 μm or less.

In the present invention, the raw materials for forming a cordierite composition are dissolved into water with an dispersing agent to prepare a slurry, and the thus prepared slurry is passed through the sieve having a mesh of 45 μm or less. After that, the slurry after sieving is dried by means of the spray drying to obtain dry powders, and the batch for forming is obtained by using the dry powders. Or, the batch for forming is obtained by the filter pressing. That is to say, the batch for forming is obtained by using the raw material powders which are passed through the sieve in a wet state. Therefore, it is possible to prevent agglutination of the raw material particles and to remove the coarse raw material particles effectively. As a result, if the extrusion molding is performed by using the thus obtained batch for forming, it is possible to form the ceramic honeycomb structural body having an extremely thin wall thickness with no defects.

BEST MODE FOR CARRYING OUT THE INVENTION

Figure 1:
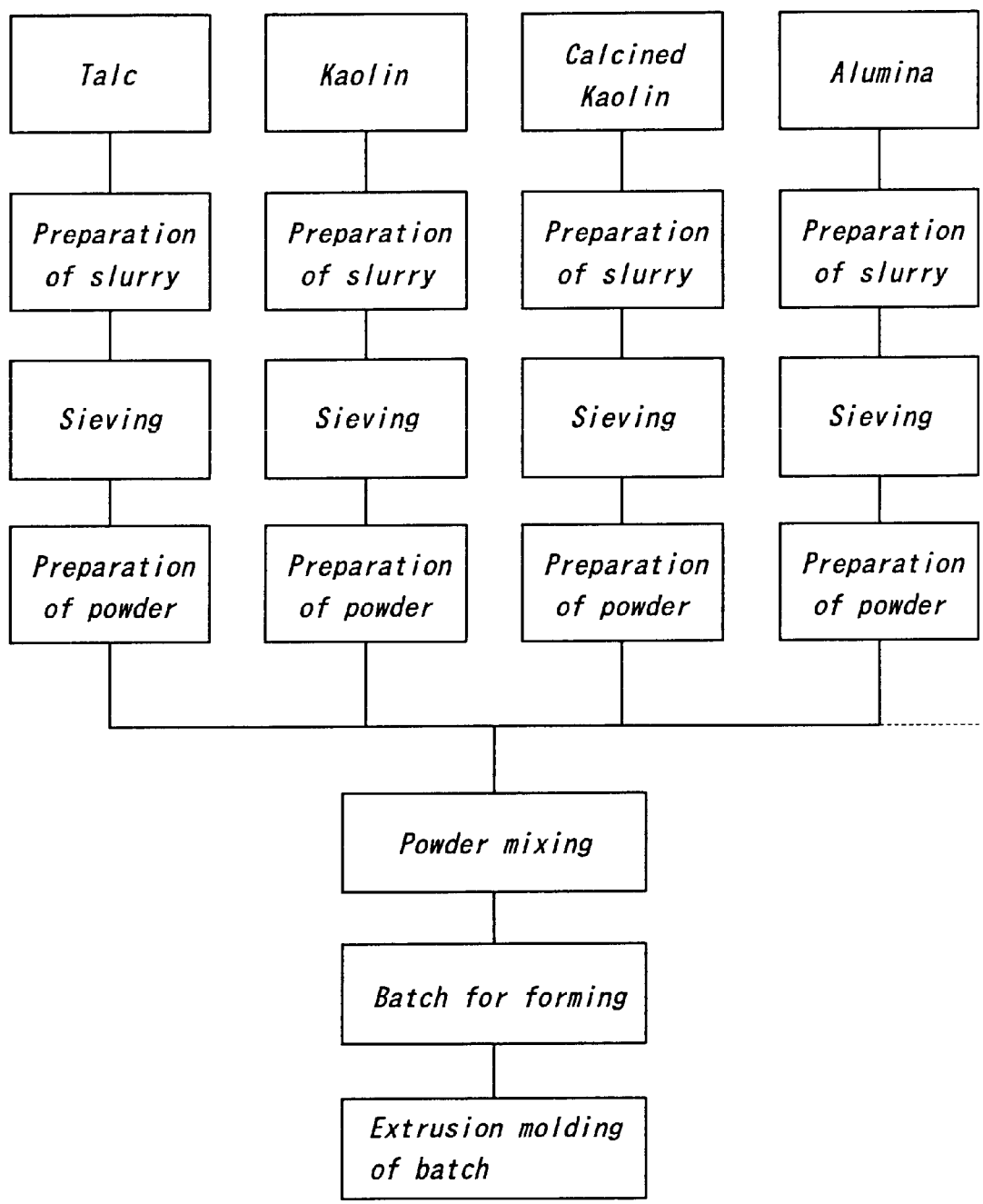
FIG. 1 is a flowchart for explaining one embodiment of a method for producing a ceramic honeycomb structural body according to a first aspect of the invention.

FIG. 1 is a flowchart for explaining one embodiment of a method of producing a ceramic honeycomb structural body according to a first aspect of the invention. The first aspect of the invention will be explained with reference to the flowchart shown in FIG. 1. At first, raw materials for forming a cordierite composition such as talc, kaolin, calcined kaolin, alumina, aluminum hydroxide, silica and so on are prepared. Then, a dispersing agent and water are added to respective raw materials so as to obtain raw material slurries respectively. Then, the thus obtained raw material slurries are respectively passed through a sieve having a mesh of 45 $\mu$m or less. After that, the raw material slurries after sieving are subjected to spray drying respectively so as to obtain respective raw material powders. Then, the thus obtained raw material powders are mixed to be a cordierite composition so as to obtain mixed powders. Then, a forming agent and water are added to the mixed powders so as to obtain a batch for forming. Finally, the thus obtained batch is subjected to an extrusion molding, so that a predetermined ceramic honeycomb structural body can be obtained.

Figure 2:
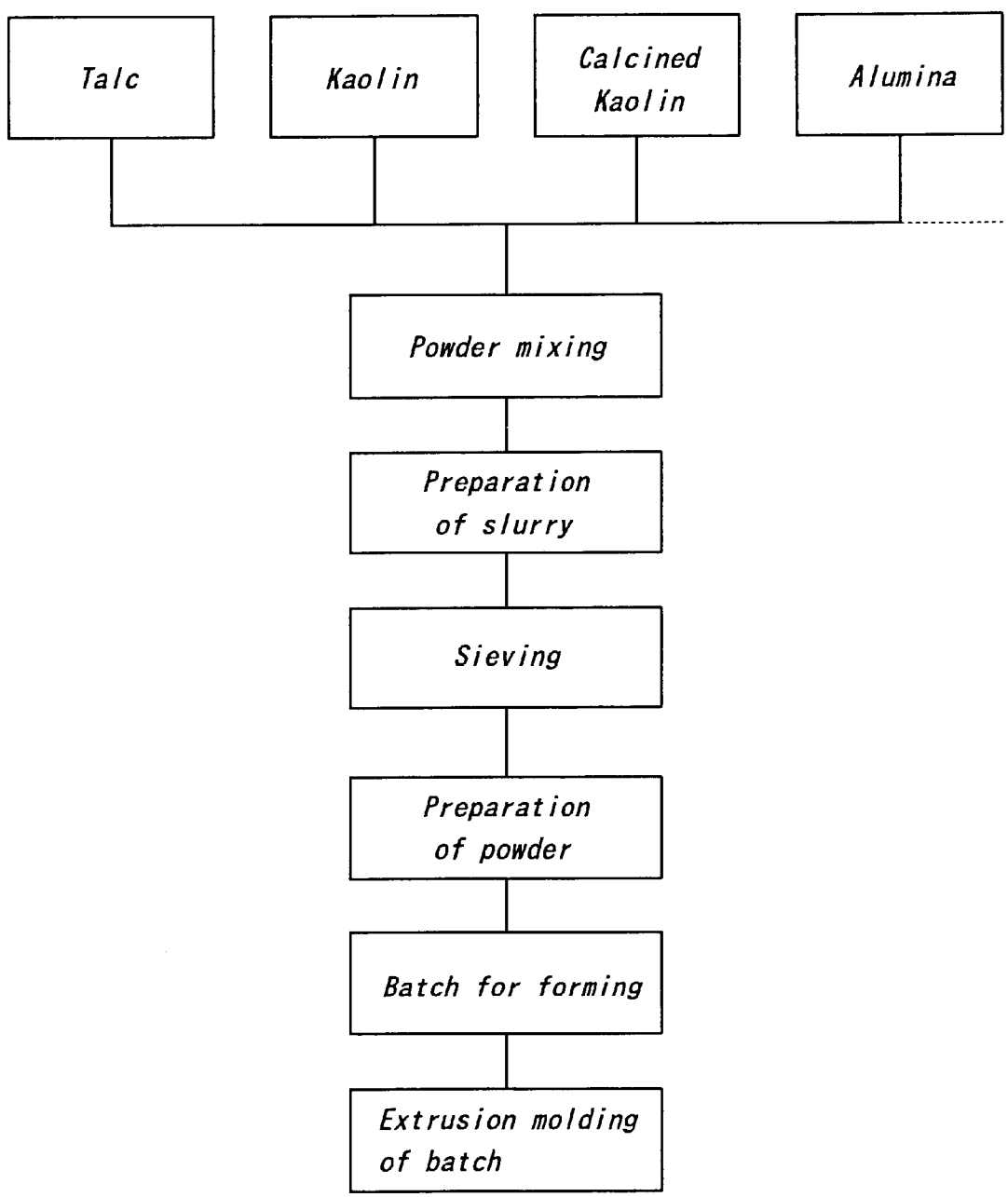
FIG. 2 is a flowchart for explaining one embodiment of a method for producing a ceramic honeycomb structural body according to a second aspect of the invention.

FIG. 2 is a flowchart for explaining one embodiment of a method for producing a ceramic honeycomb structural body according to a second aspect of the invention. The second aspect of the invention will be explained with reference to the flowchart shown in FIG. 2. At first, raw materials for forming a cordierite composition such as talc, kaolin, calcined kaolin, alumina, aluminum hydroxide, silica and so on are prepared. Then, raw materials are mixed to be a cordierite composition so as to obtain cordierite raw materials. Then, a dispersing agent and water are added to the thus obtained cordierite raw materials so as to obtain a cordierite raw material slurry. Then, the thus obtained cordierite raw material slurry is passed through a sieve having a mesh of 45 $\mu$m or less. After that, the cordierite raw material slurry after sieving is subjected to spray drying so as to obtain raw material powders. Then, a forming agent and water are added to the thus obtained raw material powders so as to obtain a batch for forming. Finally, the thus obtained batch is subjected to an extrusion molding, so that a predetermined ceramic honeycomb structural body can be obtained.

Figure 3:
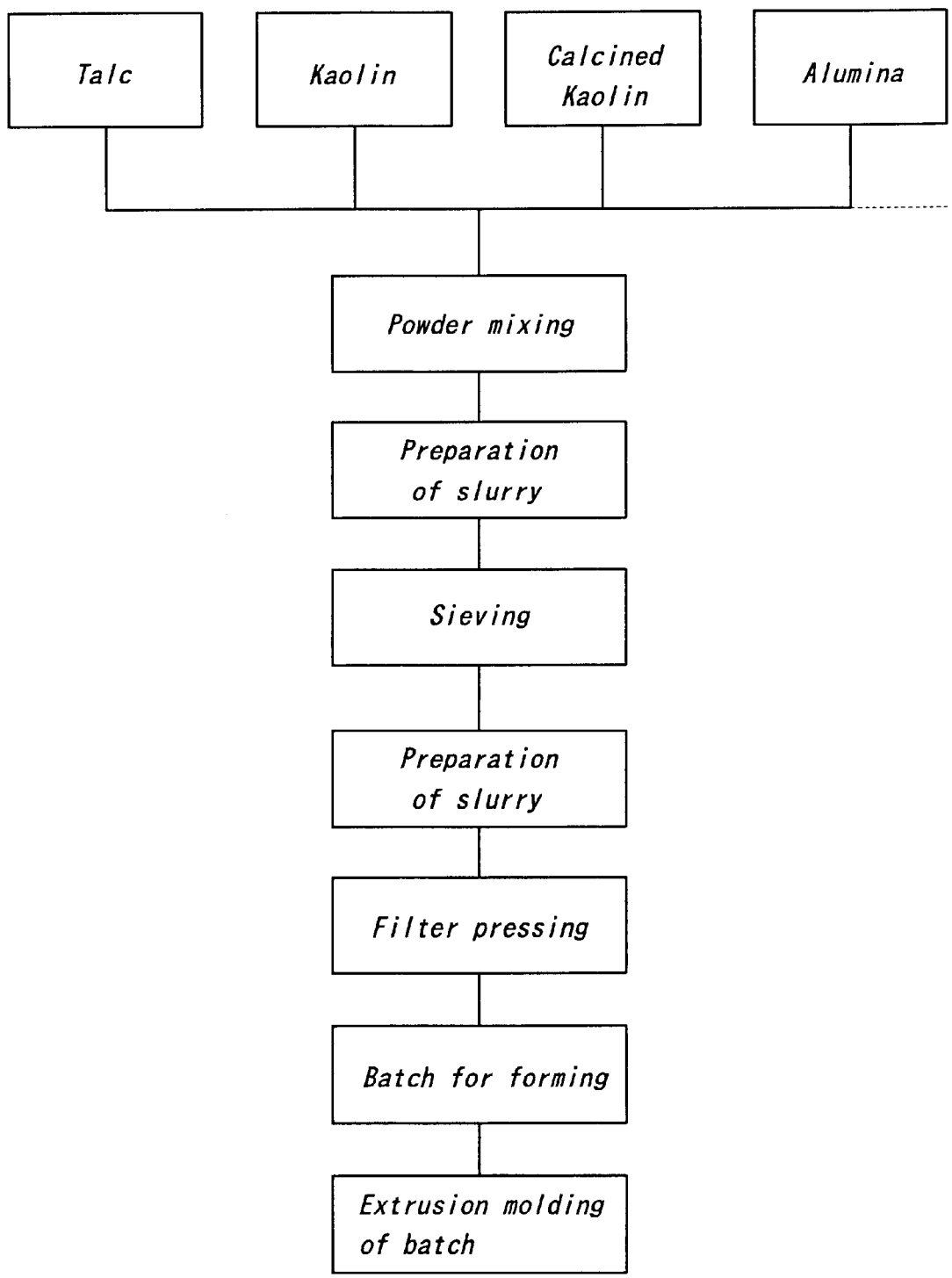
FIG. 3 is a flowchart for explaining one embodiment of a method for producing a ceramic honeycomb structural body according to a third aspect of the invention.

FIG. 3 is a flowchart for explaining one embodiment of a method for producing a ceramic honeycomb structural body according to a third aspect of the invention. The third aspect of the invention will be explained with reference to FIG. 3. At first, raw materials for forming a cordierite composition such as talc, kaolin, calcined kaolin, alumina, aluminum hydroxide, silica and so on are prepared. Then, raw materials are mixed to be a cordierite composition so as to obtain cordierite raw materials. Then, a dispersing agent and water are added to the thus obtained cordierite raw materials so as to obtain a cordierite raw material slurry. Then, the thus obtained cordierite raw material slurry is passed through a sieve having a mesh of 45 $\mu$m or less. After that, methyl cellulose and the like and slip additives are dissolved into the cordierite raw material slurry after sieving as forming agents. Then, the cordierite raw material slurry, into which the forming agents are dissolved, is subjected to filter pressing so as to obtain a batch for forming having a predetermined water amount. Finally, the thus obtained batch is subjected to an extrusion molding, so that a predetermined ceramic honeycomb structural body can be obtained.

In order to perform water reduction, water removal, drying and powder formation of the raw material slurry, there is known a technique such that the water reduction is performed by a filter pressing, the drying is performed by a hot-air dryer, and then crushing and classification are performed. In this known technique, the raw materials are agglutinated again in the case of the water reduction or the drying. Particularly, since the raw materials such as kaolin, aluminum hydroxide and so on form hard and coarse particles, an effect of sieving the hard and coarse particles by using a sieve having a mesh of 45 $\mu$m or less is not exerted at all. Moreover, if a forming agent such as methyl cellulose and the like is added to the raw material slurry after filter pressing, that includes a little amount of water, it is difficult to uniformly disperse the forming agent, and thus it is not possible to obtain an excellent batch. In order to eliminate the drawbacks mentioned above, the raw material slurry after sieving is subjected to spray drying so as to obtain raw material powders in the first and second aspect of the invention. The process is particularly effective for a continuous forming. In addition, a forming agent is added to the raw material slurry after sieving, and then a water reduction from the raw material slurry is performed by a filter pressing so as to obtain a batch in the third aspect of the invention. According to the invention, it is possible to extrude a honeycomb structural body having a wall thickness of 50 $\mu$m or less without cell defects.

Hereinafter, actual experiments will be explained.

EXPERIMENT 1

1.5 wt % of polycarboxylic acid ammonium salt was added as a dispersing agent to respective raw materials for forming a cordierite composition shown in the following Table 1 so as to obtain raw material slurries each having a solid content of 27%. Then, the raw material slurries were respectively passed through a micro sieve having a mesh of 30 $\mu$m, and the coarse particles having a diameter of 30 $\mu$m or more were removed from the raw material slurries respectively. The slurries after the coarse particle removal were subjected to spray drying so as to obtain dried-up granulated powders each having a diameter of 30 $\mu$m or less.

The dried-up raw material powders were blended at a rate shown in the following Table 1. With respect to the thus blended raw material powders, 30 wt % of water, 5 wt % of methyl cellulose binder and 1 wt % of fatty acid potash soap as a surface activate agent were added and mixed to obtain a batch for forming. The thus obtained batch was subjected to an extrusion molding by using a die for honeycomb structural extrusion having a slit width of 42 $\mu$m and a cell number of 170 cell/cm$^2$ so as to extrude a honeycomb structural body having a diameter of 100 mm and a total length of 100 mm. Then, the honeycomb structural body was subjected to a dielectric drying and a not-air drying so as to remove a water component.

In the dried-up honeycomb structural body, defective cells due to an intrusion of coarse raw material particles were not detected, and the dried-up honeycomb structural body showed an excellent condition. Then, the dried-up honeycomb structural body was sintered at an uppermost temperature of 1400° C. so as to obtain a sintered cordierite honeycomb structural body having a rib thickness of 38 $\mu$m and a cell number of 140 cell/cm². Properties of the thus obtained cordierite honeycomb structural body were shown in the following Table 2.

TABLE 1

| Name of raw materials | Blend rate (%) | Average particle size (μm) | Rate of +45 μm (ppm) |
|---|---|---|---|
| Talc | 41 | 6.5 | 8 |
| Kaolin | 26 | 3.0 | 15 |
| Calcined Kaolin | 18 | 2.8 | 10 |
| Alumina | 15 | 5.0 | 12 |

TABLE 2

| Sintering shrinkage (%) | Porosity (%) | Average micropore diameter (μm) | Thermal expansion coefficient ($\times 10^{-6}/°$ C.) |
|---|---|---|---|
| 6 | 28 | 46.5 | 0.35 |

EXPERIMENT 2

Raw materials shown in the following Table 3 were blended at a rate shown in Table 3 so as to obtain a mixture, and 1.5 wt % of polycarboxylic acid ammonium salt was added as a dispersing agent to the mixture so as to obtain a slurry having a solid content of 27%. Then, the slurry was passed through a micro sieve having a mesh of 30 μm so as to remove coarse particles having a diameter of 30 μm or more from the slurry. The slurry after the coarse particle removal was subjected to spray drying so as to obtain dried-up granulated powders each having a diameter of 30 μm or less.

With respect to the raw material powders after spray drying, 28 wt % of water, 5 wt % of methyl cellulose binder and 1 wt % of fatty acid potash soap as a surface activate agent were added and mixed so as to obtain a batch for forming. The thus obtained batch was subjected to an extrusion molding by using a die for honeycomb structural extrusion having a slit width of 40 μm and a cell number of 160 cell/cm² so as to extrude a honeycomb structural body having a diameter of 100 mm and a total length of 100 mm. Then, the honeycomb structural body was subjected to a dielectric drying and a not-air drying so as to remove a water component.

In the dried-up honeycomb structural body, defective cells due to an intrusion of coarse raw material particles were not detected, and the dried-up honeycomb structural body showed an excellent condition. Then, the dried-up honeycomb structural body was sintered at an uppermost temperature of 1400° C. so as to obtain a sintered cordierite honeycomb structural body having a rib thickness of 38 μm and a cell number of 140 cell/cm². Properties of the thus obtained cordierite honeycomb structural body were shown in the following Table 4.

TABLE 3

| Name of raw materials | Blend rate (%) | Average particle size (μm) | Rate of +45 μm (ppm) |
|---|---|---|---|
| Talc | 38 | 6.5 | 8 |
| Kaolin | 20 | 3.0 | 15 |
| Calcined Kaolin | 8 | 2.8 | 10 |
| Alumina | 9 | 5.0 | 12 |
| Aluminum hydroxide | 17 | 2.0 | 20 |
| Silica | 8 | 5.0 | 5 |

TABLE 4

| Sintering shrinkage (%) | Porosity (%) | Average micropore diameter (μm) | Thermal expansion coefficient ($\times 10^{-6}/°$ C.) |
|---|---|---|---|
| 4 | 34 | 3.5 | 0.25 |

Raw materials were blended as is the same as Table 3 of experiment 2 so as to obtain a mixture, and 1.5 wt % of polycarboxylic acid ammonium salt was added as a dispersing agent to the mixture so as to obtain a slurry having a solid content of 15%. Then, the slurry was passed through a micro sieve having a mesh of 30 μm so as to remove coarse particles having a diameter of 30 μm or more from the slurry.

With respect to a solid component of the raw material slurry after sieving, 5 wt % of methyl cellulose binder and 1 wt % of fatty acid potash soap as a surface activate agent were added, and the slurry was mixed under a temperature of 20° C. or less so as to obtain a uniform slurry. After that, the slurry was subjected to filter pressing so as to obtain a batch for forming having a water amount of 22%. The thus obtained batch was subjected to an extrusion molding by using a die for honeycomb structural extrusion having a slit width of 40 μm and a cell number of 160 cell/cm² so as to extrude a honeycomb structural body having a diameter of 100 mm and a total length of 100 mm. Then, the honeycomb structural body was subjected to a dielectric drying and a not-air drying so as to remove a water component.

In the dried-up honeycomb structural body, defective cells due to an intrusion of coarse raw material particles were not detected, and the dried-up honeycomb structural body showed an excellent condition. Then, the dried-up honeycomb structural body was sintered at an uppermost temperature of 1400° C. so as to obtain a sintered cordierite honeycomb structural body having a rib thickness of 38 μm and a cell number of 140 cell/cm².

INDUSTRIAL APPLICABILITY

As is clearly understood from the above explanations, according to the invention, the raw materials for forming a cordierite composition are dissolved into water with an dispersing agent to prepare a slurry, and the thus prepared slurry is passed through the sieve having a mesh of 45 μm or less. After that, the slurry after sieving is dried by means of the spray drying to obtain dry powders, and the batch for forming is obtained by using the dry powders. Or, the batch for forming is obtained by the filter pressing. That is to say, the batch for forming is obtained by using the raw material powders which are passed through the sieve in a wet state. Therefore, it is possible to prevent agglutination of the raw material particles and to remove the coarse raw material particles effectively. As a result, if the extrusion molding is performed by using the thus obtained batch for forming, it is possible to form the ceramic honeycomb structural body having an extremely thin wall thickness with no defects.

What is claimed is:

1. A method for producing a ceramic honeycomb structural body, comprising the steps of: providing raw materials for forming a cordierite composition; preparing slurries of respective raw materials to obtain raw material slurries respectively; allowing the thus obtained raw materials slurries to pass through a sieve having a mesh of 45 µm or less; subjecting the raw material slurries, that are passed through the sieve, respectively to spray drying to prepare raw material powders; mixing the thus prepared raw material powders to obtain a mixture having a cordierite composition; adding a forming agent and water to the thus obtained mixture to obtain a batch for forming; and subjecting the thus obtained batch for forming to an extrusion molding to obtain a honeycomb structural body having a wall thickness of 50 µm or less.

2. A method for producing a ceramic honeycomb structural body, comprising the steps of: providing a mixture of raw materials for forming a cordierite raw material slurry; allowing the thus obtained cordierite raw material slurry to pass through a sieve having a mesh of 45 µm or less; subjecting the cordierite raw material slurry, that is passed through the sieve, to spray drying to prepare raw material powders; adding a forming agent and water to the thus prepared raw material powders to obtain a batch for forming; and subjecting the thus obtained batch for forming to an extrusion molding to obtain a honeycomb structural body having a wall thickness of 50 µm or less.

3. A method of producing a ceramic honeycomb structural body, comprising the steps of: providing a mixture of raw materials for forming a cordierite composition; preparing a slurry of the mixture to obtain a cordierite raw material slurry; allowing the thus obtained cordierite raw material slurry to pass through a sieve having a mesh of 45 µm or less; dissolving methyl cellulose and slip additives into the cordierite raw material slurry, that is passed through the sieve, as forming agents; subjecting the cordierite raw material slurry into which the forming agents are dissolved to filter pressing to obtain a batch for forming having a predetermined water amount; and subjecting the thus obtained batch for forming to an extrusion molding obtain a honeycomb structural body having a wall thickness of 50 µm or less.

4. The method for producing a ceramic honeycomb structural body according to claim 1, wherein the raw materials for forming a cordierite composition are talc, kaolin, calcined kaolin, alumina, aluminum hydroxide and silica.

* * * * *